United States Patent
Chalin et al.

(10) Patent No.: US 7,152,866 B2
(45) Date of Patent: Dec. 26, 2006

(54) STEERABLE AND LIFTABLE INDEPENDENT SUSPENSION SYSTEM

(75) Inventors: Thomas N. Chalin, Fairview, TX (US); Cully B. Dodd, McKinney, TX (US); Herbert D. Hudson, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 371 days.

(21) Appl. No.: 10/757,760

(22) Filed: Jan. 14, 2004

(65) Prior Publication Data

US 2005/0151337 A1 Jul. 14, 2005

(51) Int. Cl.
*B62D 61/12* (2006.01)
*B60G 3/18* (2006.01)

(52) U.S. Cl. .............. 280/86.5; 280/124.135; 280/43.17; 180/209

(58) Field of Classification Search ............... 280/86.5, 280/124.135, 43.17, 43.18, 43.23, 6.15, 6.157, 280/5.514; 180/209
See application file for complete search history.

(56) References Cited

U.S. PATENT DOCUMENTS

| | | | |
|---|---|---|---|
| 3,181,878 A | 5/1965 | Vogel ..................... 280/5.507 |
| 3,191,954 A | 6/1965 | Schuetz ................... 280/6.153 |
| 4,079,798 A | 3/1978 | Ferris ..................... 180/24.02 |
| 4,105,222 A | 8/1978 | Buchwald | |
| 4,186,815 A | 2/1980 | Hart .......................... 180/41 |
| 4,469,369 A | 9/1984 | Belik et al. ................. 296/178 |
| 4,492,389 A | 1/1985 | Wyatt et al. ............... 280/86.5 |
| 4,856,814 A | 8/1989 | Jones | |
| 4,958,584 A | 9/1990 | Williamson ............... 440/12.52 |
| 5,090,495 A | 2/1992 | Christenson ............. 180/24.02 |
| 5,230,528 A | 7/1993 | Van Raden et al. | |
| 5,303,946 A | 4/1994 | Youmans et al. ........ 280/405.1 |
| 5,540,454 A * | 7/1996 | VanDenberg et al. ...... 280/81.1 |
| 5,593,175 A * | 1/1997 | Oda et al. .................... 104/281 |
| 5,597,174 A | 1/1997 | Christenson et al. ...... 280/86.5 |
| 5,865,452 A * | 2/1999 | Chalin ................. 280/124.125 |
| 6,036,201 A | 3/2000 | Pond et al. .............. 280/5.514 |
| 6,056,305 A | 5/2000 | Pribyl | |
| 6,073,946 A | 6/2000 | Richardson | |
| 6,182,984 B1 * | 2/2001 | Chalin ................... 280/86.751 |
| 6,203,039 B1 | 3/2001 | Gorden | |
| 6,247,713 B1 * | 6/2001 | Konop ...................... 280/86.5 |
| 6,398,236 B1 | 6/2002 | Richardson | |
| 6,419,247 B1 | 7/2002 | Moran ....................... 280/86.5 |

(Continued)

FOREIGN PATENT DOCUMENTS

WO   WO 02/26544 A2   4/2002

OTHER PUBLICATIONS

Meritor product brochure, "Premium RideStar Suspension Systems," dated Sep. 2002.

(Continued)

*Primary Examiner*—Paul N. Dickson
*Assistant Examiner*—Joselynn Y. Sliteris
(74) *Attorney, Agent, or Firm*—Smith IP Services, P.C.

(57) ABSTRACT

A liftable independent suspension system which may also be steerable. In a described embodiment, a liftable suspension system for use on a vehicle includes wheel spindles positioned to extend outwardly at each respective lateral side of the vehicle. The spindles are displaceable independent of each other. An actuator is operable to raise at least one of the spindles, so that a tire rotatably connected to the spindle is liftable out of engagement with a road surface when the actuator raises the spindle.

35 Claims, 6 Drawing Sheets

U.S. PATENT DOCUMENTS

| | | | |
|---|---|---|---|
| 6,478,317 B1 * | 11/2002 | Konop | 280/86.5 |
| 7,017,690 B1 | 3/2006 | Burke | 180/24.07 |
| 2002/0014754 A1 | 2/2002 | Konop | |
| 2002/0020979 A1 | 2/2002 | Smith | |
| 2002/0033585 A1 | 3/2002 | Konop | |
| 2002/0117823 A1 | 8/2002 | Mlsna | |
| 2003/0107198 A1 | 6/2003 | VanDenberg | |
| 2003/0111810 A1 | 6/2003 | Fulton | |
| 2003/0151221 A1 | 8/2003 | Kuhn et al. | |
| 2003/0151222 A1 | 8/2003 | Sutton et al. | |

OTHER PUBLICATIONS

Aei magazine, Nov. 2003 issue, p. 82.
Watson & Chalin Drawing No. 100293.

* cited by examiner

STEERABLE AND LIFTABLE INDEPENDENT SUSPENSION SYSTEM

BACKGROUND

The present invention relates generally to vehicle suspension systems and, in an embodiment described herein, more particularly provides a liftable independent suspension system which may also be steerable.

In the heavy truck industry it is sometimes desirable to equip a vehicle with a liftable suspension system. The liftable suspension system has a capability of lifting tires (on wheels attached to the suspension system) out of engagement with a road surface when the load carrying ability of the suspension system is not needed. This lifting of the suspension system reduces wear on the tires and the remainder of the suspension system.

It would be beneficial to provide a liftable suspension system which is also independent. An independent liftable suspension system would reduce weight by eliminating the need to extend an axle laterally across the vehicle, etc.

It would also be beneficial to provide such a suspension system which is steerable. This would improve maneuverability of the vehicle, reduce tire scuffing during turning, etc.

SUMMARY

In carrying out the principles of the present invention, in accordance with an embodiment thereof, an improved liftable suspension system is provided which is also an independent suspension system. The suspension system may also be provided with a steering mechanism.

In one aspect of the invention, a liftable suspension system for use on a vehicle is provided. The suspension system includes wheel spindles positioned to extend outwardly at each respective lateral side of the vehicle. The spindles are displaceable independent of each other. An actuator is operable to raise at least one of the spindles, so that a tire rotatably connected to the spindle is liftable out of engagement with a road surface when the actuator raises the spindle.

In another aspect of the invention, a liftable suspension system is provided which includes wheel spindles and support devices. Each of the spindles extends outwardly from a respective one of the support devices. Each of the support devices is pivotably connected to a respective one of the arms, and each of the arms is configured for pivotable connection to a frame of the vehicle. An actuator is operative to lift at least one of the support devices relative to the vehicle frame when the suspension system is attached to the frame. The support devices are displaceable relative to the vehicle frame independently of each other when the suspension system is attached to the frame.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
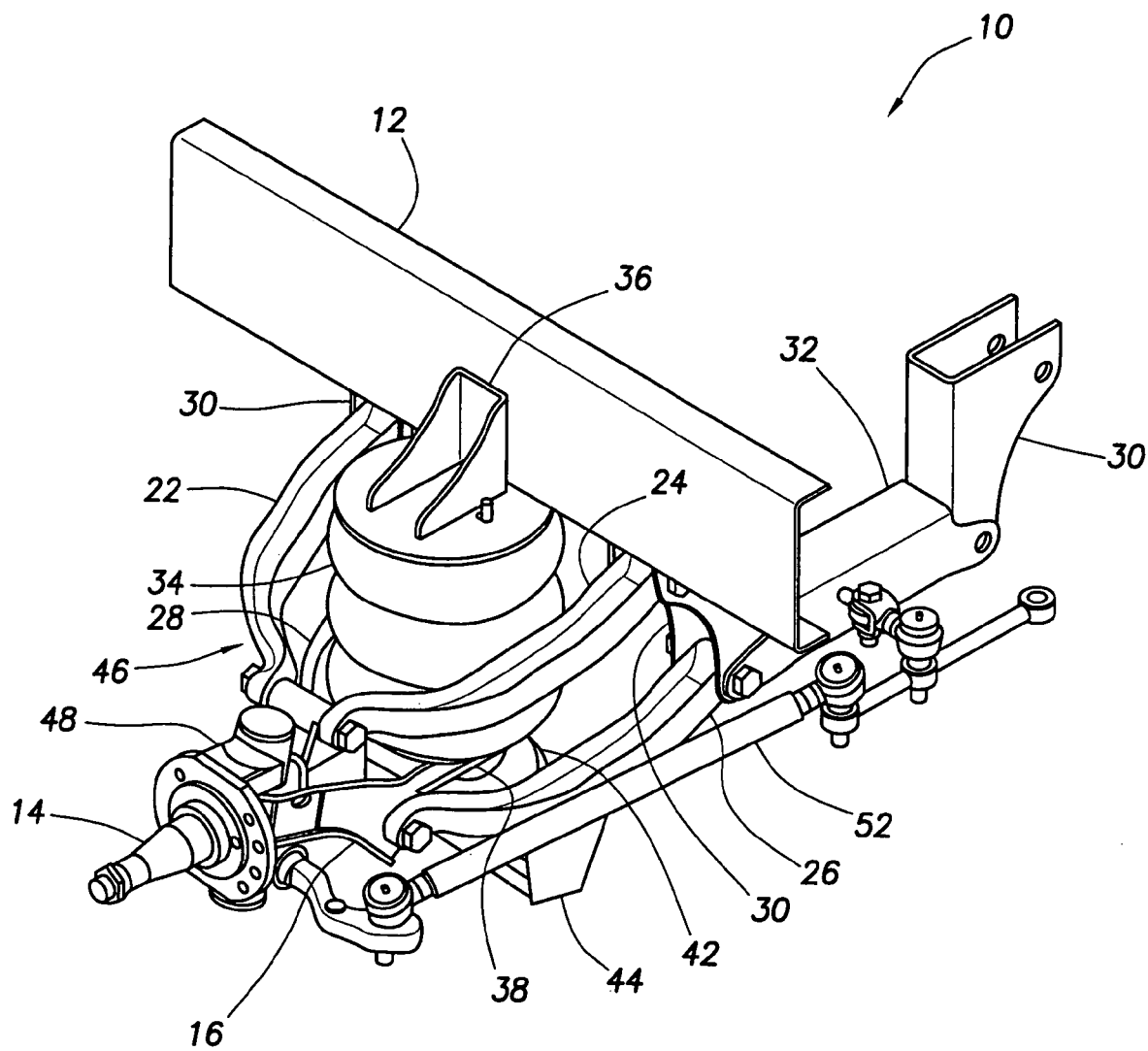
FIG. 1 is an isometric view of a suspension system embodying principles of the present invention.

Representatively illustrated in FIG. 1 is a liftable suspension system 10 which embodies principles of the present invention. In the following description of the suspension system 10 and other apparatus and methods described herein, directional terms, such as "above", "below", "upper", "lower", etc., are used for convenience in referring to the accompanying drawings.

Additionally, it is to be understood that the various embodiments of the present invention described herein are used merely as examples to depict applications of the principles of the invention. Thus, the invention is not limited to any particular details of these embodiments.

As depicted in FIG. 1, the suspension system 10 is attached to a frame 12 of a vehicle. A wheel spindle 14 is supported relative to the frame 12 by a device 16. The spindle 14 is used to rotatably mount a wheel 18 and tire 20 (not shown in FIG. 1, see FIG. 7) to the frame 12. For clarity and convenience of illustration, only one device 16 and spindle 14 are depicted in FIG. 1, but in actual practice one of each is positioned on opposite lateral sides of the frame 12.

The device 16 is displaceable upwardly and downwardly relative to the frame 12. For this purpose, four arms 22, 24, 26, 28 are pivotably connected between the device 16 and the frame 12. Two upper arms 22, 24 are each pivotably connected at an upper portion of the device 16, and are each pivotably connected at an upper portion of a respective one of two brackets 30 attached to the frame 12.

Two lower arms 26, 28 are each pivotably connected at a lower portion of the device 16 and at a lower portion of a respective one of the brackets 30. For clarity and convenience, only the arms 22, 24, 26, 28 on one lateral side of the frame 12 are depicted in FIG. 1, it being understood that another set of the arms is positioned on the opposite side of the frame. The lower portions of the brackets 30 on opposite sides of the frame may be structurally interconnected by a crossmember 32 (only one of which is depicted in FIG. 1).

The frame 12 is supported above the device 16 by means of an air spring 34. The air spring 34 is positioned between a bracket 36 attached to the frame 12 and an inwardly extending portion 38 of the device 16. When pressure is supplied to the air spring 34, the air spring applies a downwardly directed biasing force to the device portion 38. In this manner, the vehicle frame 12 is suspended above a road surface 40 (not shown in FIG. 1, see FIG. 7) by the suspension system 10.

Note that the suspension system 10 is an independent suspension system, since the device 16 on one lateral side of the frame 12 can displace upwardly and downwardly relative to the frame independently of the device positioned on the opposite side of the frame. There is no axle extending between the devices 16 on opposite sides of the frame 12.

Instead, the pivoting displacement of the arms 22, 24, 26, 28 on one side of the frame 12 allow the device 16 on that side of the frame to displace upwardly or downwardly, whether or not the device on the other side of the frame also displaces.

Note that the arms 22, 24, 26, 28 on one side of the frame 12 form a suspension of the type known to those skilled in the art as a four link parallelogram-type suspension. Thus, the device 16 can displace upwardly and downwardly without pivoting with respect to the frame 12, which would cause a change in camber angle. However, it is not necessary for the arms 22, 24, 26, 28 to form a parallelogram-type suspension 46. For example, a modified parallelogram suspension could be used, or another type of suspension could be used.

It also is not necessary for each device 16 to be connected to the frame 12 using four separate arms 22, 24, 26, 28. The upper arms 22, 24 and/or the lower arms 26, 28 could be formed as an integral unit (such as an A-arm in an automotive suspension system), or as a single arm (see FIGS. 8 & 9, in which a single lower arm is used). Furthermore, either the upper arms 22, 24 or the lower arms 26, 28 could be eliminated, if desired. For example, a strut (not shown) could be used to maintain camber angle in conjunction with use of only the upper arms 22, 24 or only the lower arms 26, 28.

The arms 22, 24, 26, 28 may be made of metal. For example, the arms 22, 24, 26, 28, or any of them, could be formed from welded-together metal plates, bent metal sheets, a casting, or a forging, etc. Alternatively, one or more of the arms 22, 24, 26, 28 could be formed using a composite material, such as a resin-impregnated woven or braided fabric.

In one unique feature of the suspension system 10, the suspension system 10 is liftable to raise the tire 20 out of contact with the road surface 40. For this purpose, a pneumatic actuator 42 is connected between the portion 38 of the device 16 and a bracket 44 extending downwardly between the two lower arms 26, 28. The bracket 44 is attached to each of the lower arms 26, 28 and extends between these arms.

Figure 2:
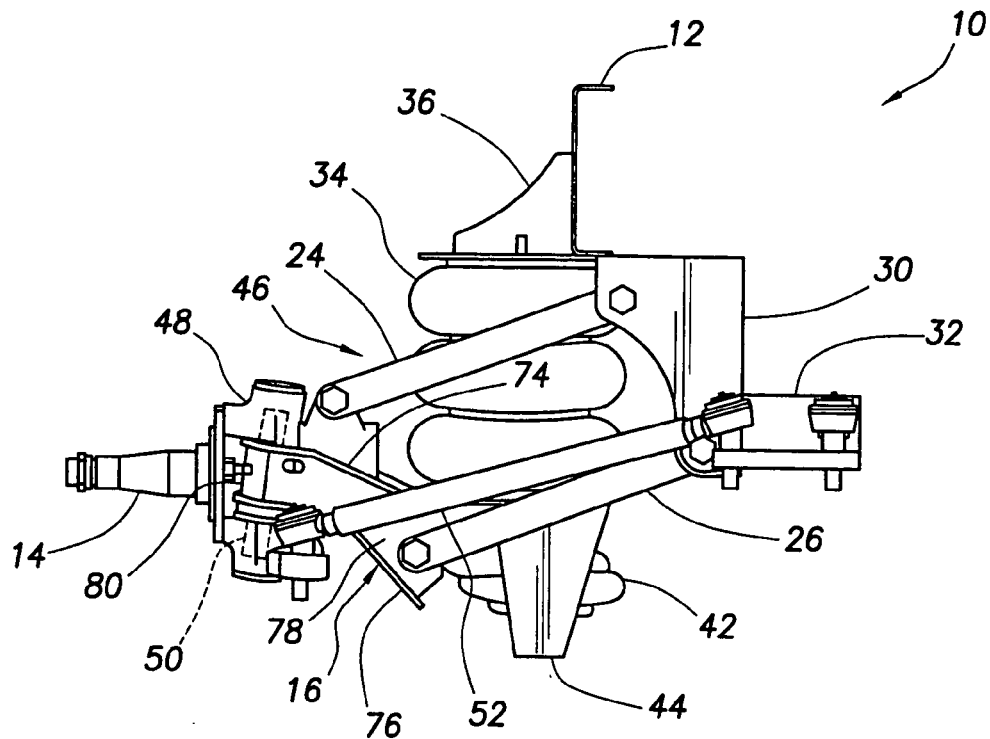
FIG. 2 is an elevational view of the suspension system of FIG. 1.

A clearer view of the actuator 42 is depicted in FIG. 2. In this view it may be seen that the actuator 42, when supplied with pressure, will apply a downwardly directed force to the bracket 44 and an upwardly directed force to the device portion 38. The actuator 42 will thus elongate, forcing the device portion 38 to pivot upwardly relative to the bracket 44, causing the device 16 to be raised relative to the frame 12.

Note that the actuator 42 applies its upwardly directed force to the device portion 38 on an opposite side of the device portion from the side where the air spring 34 applies its downwardly directed force to the device portion. Preferably, these forces are not simultaneously applied to the device portion 38.

The use of the actuator 42 and bracket 44 attached to the lower arms 26, 28 is only one of a wide variety of means for lifting the device 16 relative to the frame 12. Several of these are representatively illustrated in FIGS. 3–7 and are described below. Each of these utilize a pneumatic actuator, but other types of actuators may be used, if desired. For example, electric actuators (such as solenoids, motors, etc.), hydraulic actuators, or any other type of actuators could be used.

Another unique feature of the suspension system 10 is that it is steerable as well as being liftable and independent. However, it should be clearly understood that it is not necessary for a suspension system to be steerable in keeping with the principles of the invention. Instead, the spindles 14 could be rigidly mounted on the devices 16.

For steering the suspension system 10, the spindle 14 is rotatably connected to the device 16 via a steering knuckle 48. The steering knuckle 48 pivots about a king pin 50 secured to the device 16. Other means of rotating the spindle 14 relative to the device 16 may be used, if desired. For example, one or more king pins could be secured to the spindle 14 for rotation relative to corresponding recesses formed in the device, etc.

The steering knuckles 48 on opposite sides of the frame 12 are preferably connected by a tie rod assembly 52. This connection forces the steering knuckles 48 (and, thus, the spindles 14) to rotate together, thereby controlling the steering of the suspension system 10.

Figure 3:
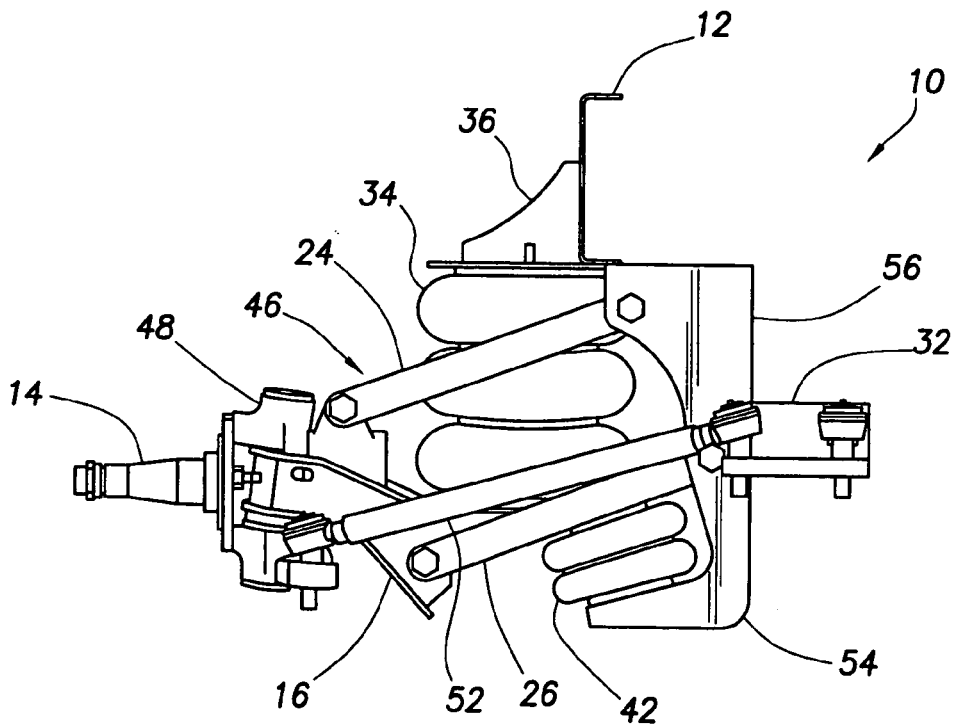
FIG. 3 is an elevational view of a second suspension system embodying principles of the invention.

Referring additionally now to FIG. 3, the suspension system 10 is depicted with an alternate location of the actuator 42. In this embodiment, the actuator 42 is positioned between the lower arm 26 and a downwardly extending portion 54 of a bracket 56. The bracket 56 is attached to the frame 12 and has the arms 24, 26 pivotably connected thereto.

In effect, the bracket 56 takes the place of the bracket 30 described above, and additionally provides the lower portion 54 for mounting an end of the actuator 42. When pressure is supplied to the actuator 42, it elongates and forces the lower arm 26 to pivot upwardly. That is, the actuator 42 applies an upwardly directed biasing force to the lower arm 26 and a downwardly directed biasing force to the lower portion 54 of the bracket 56. As the lower arm 26 pivots upwardly, the device 16 and spindle 14 are raised relative to the frame 12.

Alternatively, the actuator 42 could be interconnected between the lower portion 54 of the bracket 56 and the inwardly extending portion 38 of the device 16. In this configuration, when pressure is supplied to the actuator 42, it will elongate and bias the device 16 upwardly, thereby raising the spindle 14 relative to the frame.

Only one actuator 42 may be used on each lateral side of the frame 12, or two or more actuators may be used. For example, a separate actuator 42 may be used to apply an upwardly directed biasing force to each of the lower arms 26, 28, if desired.

Figure 4:
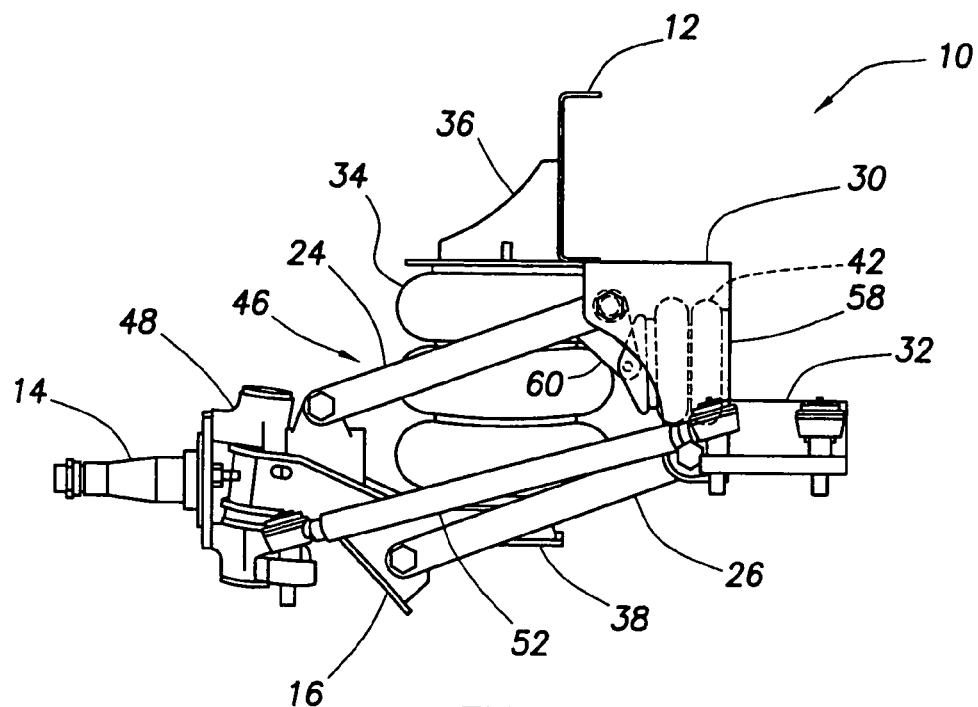
FIG. 4 is an elevational view of a third suspension system embodying principles of the invention.

Referring additionally now to FIG. 4, the suspension system 10 is representatively illustrated with the actuator 42 in another position. In this embodiment, the actuator 42 is positioned between an inner wall 58 of the bracket 30 and a downwardly extending lever 60 attached to the upper arm 24. Preferably, an end of the actuator 42 is pivotably connected to the lever 60.

When the actuator 42 is supplied with pressure, it elongates and biases the lever 60 outward. This causes the upper arm 24 to pivot upwardly relative to the bracket 30, thereby raising the device 16 relative to the frame 12.

Figure 5:
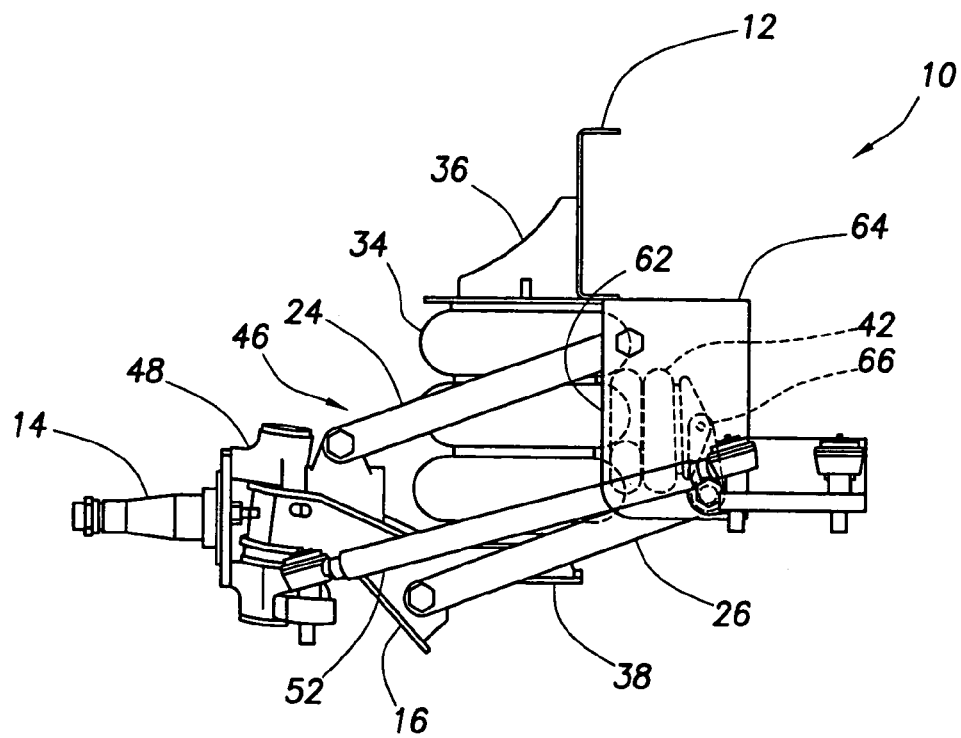
FIG. 5 is an elevational view of a fourth suspension system embodying principles of the invention.

Referring additionally now to FIG. 5, the suspension system 10 is depicted in another configuration. In this embodiment, the actuator 42 is positioned between an outer wall 62 of a bracket 64 and a lever 66 attached to the lower arm 26. The bracket 64 is used instead of the bracket 30 in this embodiment, but the arms 24, 26 are still pivotably connected to the bracket 64.

When pressure is supplied to the actuator 42, it elongates and biases the lever 66 to rotate clockwise as viewed in FIG. 5. This causes the lower arm 26 to rotate upwardly relative to the bracket 64, thereby raising the device 16 relative to the frame 12.

Figure 6:
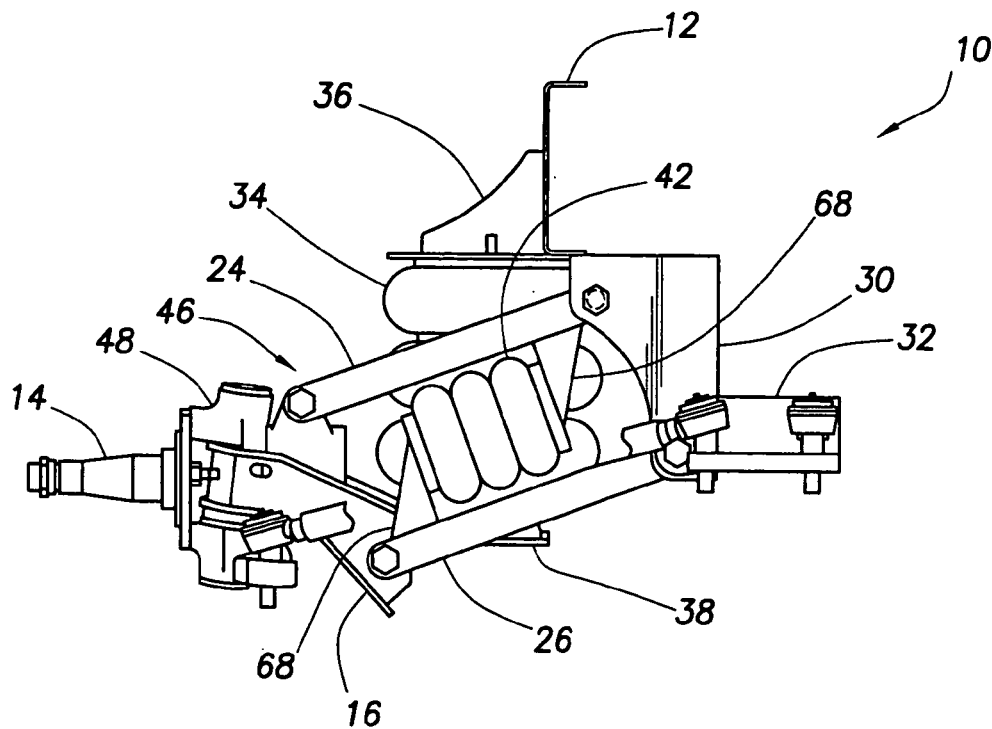
FIG. 6 is an elevational view of a fifth suspension system embodying principles of the invention.

Referring additionally now to FIG. 6, yet another embodiment of the suspension system 10 is representatively illustrated. In this embodiment, the actuator 42 is positioned between brackets or levers 68 attached to each of the upper and lower arms 24, 26. When pressure is supplied to the actuator 42, it elongates and biases the levers 68 to pivot away from each other. Each of the arms 24, 26 is thereby pivoted upwardly relative to the bracket 30, causing the device 16 to raise relative to the frame 12.

Another actuator 42 and levers 68 could be used with the other arms 22, 28 on the opposite side of the device 16. Thus, one, two, or any other number of the actuators 42 could be used as desired. If only a single lower arm is used in place of the two lower arms 26, 28, then one actuator could be used between the upper arm 22 and the single lower arm, and another actuator could be used between the other upper arm 24 and the single lower arm. Thus, any number of arms may also be used.

Figure 7:
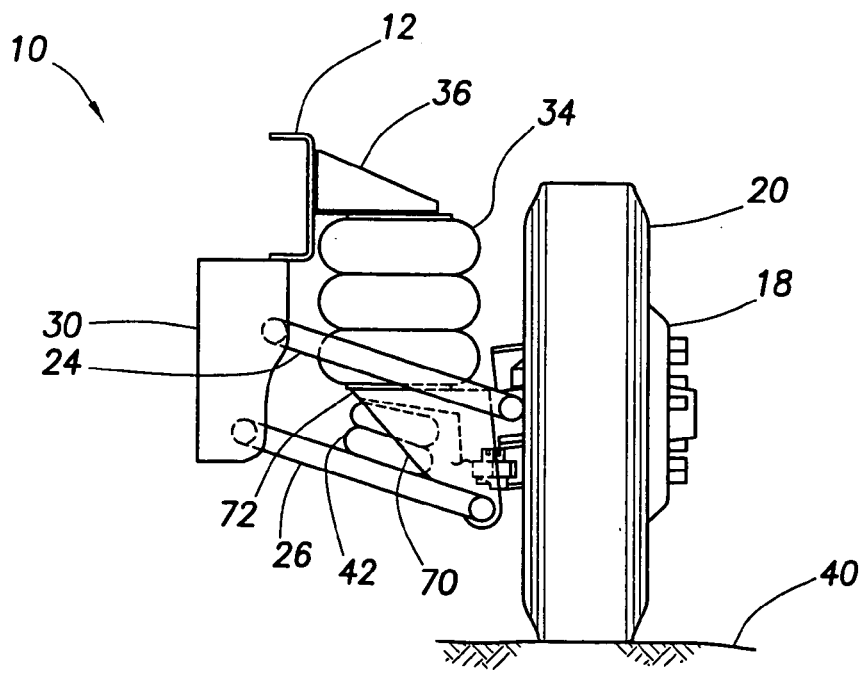
FIG. 7 is an elevational view of a sixth suspension system embodying principles of the invention.

Referring additionally now to FIG. 7, a further embodiment of the suspension system 10 is representatively illustrated. In this embodiment, the actuator 42 is connected between the lower arm 26 and a device 70 as in the embodiment of FIGS. 1 & 2, but the device 70 is somewhat differently configured and a downwardly extending bracket is not used between the lower arms 26, 28.

For increased ground clearance, the actuator 42 is positioned substantially above the lower arm 26 and is connected at its upper end to the interior of an inwardly extending portion 72 of the device 70. Note, also, that the air spring 34 is positioned so that its upper end is above a lower side of the frame 12, and the air spring is entirely outwardly positioned relative to the frame. The lower end of the air spring 34 is connected to an upper side of the device portion 72, opposite the side to which the upper end of the actuator 42 is connected.

The device 70 has the spindle 14 rotatably connected thereto for steering the wheel 18. Preferably, the device 70 is fabricated by forging or casting, whereas the device 16 is preferably made up of interconnected plates. For example, the device 16 may include welded together upper plate 74, lower plate 76 and side plates 78, each connected to a king pin housing 80 which secures the king pin 50 to the device (see FIG. 2), whereas the device 70 may be a single integrally formed piece with the king pin 50 received in a machined bore in the device. Thus, it may be seen that a variety of configurations may be used for the devices 16, 70, and for any of the other elements of the suspension system 10 described above.

Figure 8:
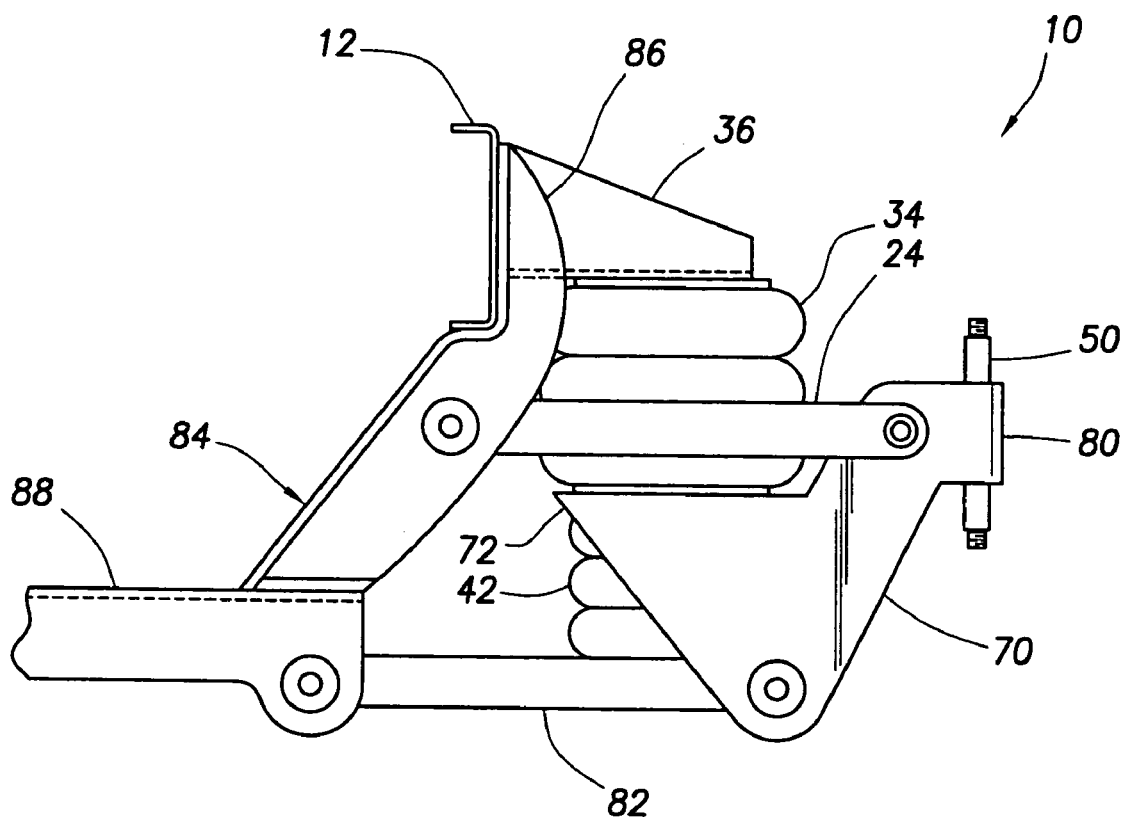
FIG. 8 is an elevational view of a seventh suspension system embodying principles of the invention.

Referring additionally now to FIG. 8, a further embodiment of the suspension system 10 is representatively illustrated. In this embodiment, only a single lower arm 82 is used. The single lower arm 82 is pivotably connected to a lower end of the device 70, and is pivotably connected to a bracket assembly 84 which is attached to the frame 12.

The bracket assembly 84 includes a downwardly extending bracket 86 attached to the frame 12. The upper arms 22, 24 are pivotably connected directly to the bracket 86. The lower arm 82 is pivotably connected to the bracket 86 by means of a crossmember 88 which extends laterally across the frame 12 to another bracket 86 attached at an opposite side of the frame. That is, the lower arm 82 is pivotably connected directly to the crossmember 88, and the crossmember is attached at a lower end of the bracket 86.

The actuator 42 is positioned between the lower arm 82 and the inwardly extending portion 72 of the device 70. When pressure is supplied to the actuator 42, it elongates and biases the device 70 upwardly, thereby raising the device relative to the frame 12. Although not shown in FIG. 8, the spindle 14 is preferably pivotably connected to the device 70 using the steering knuckle 48 which pivots about the king pin 50. However, if the steering feature is not desired, the spindle 14 may be rigidly connected to the device 70.

Figure 9:
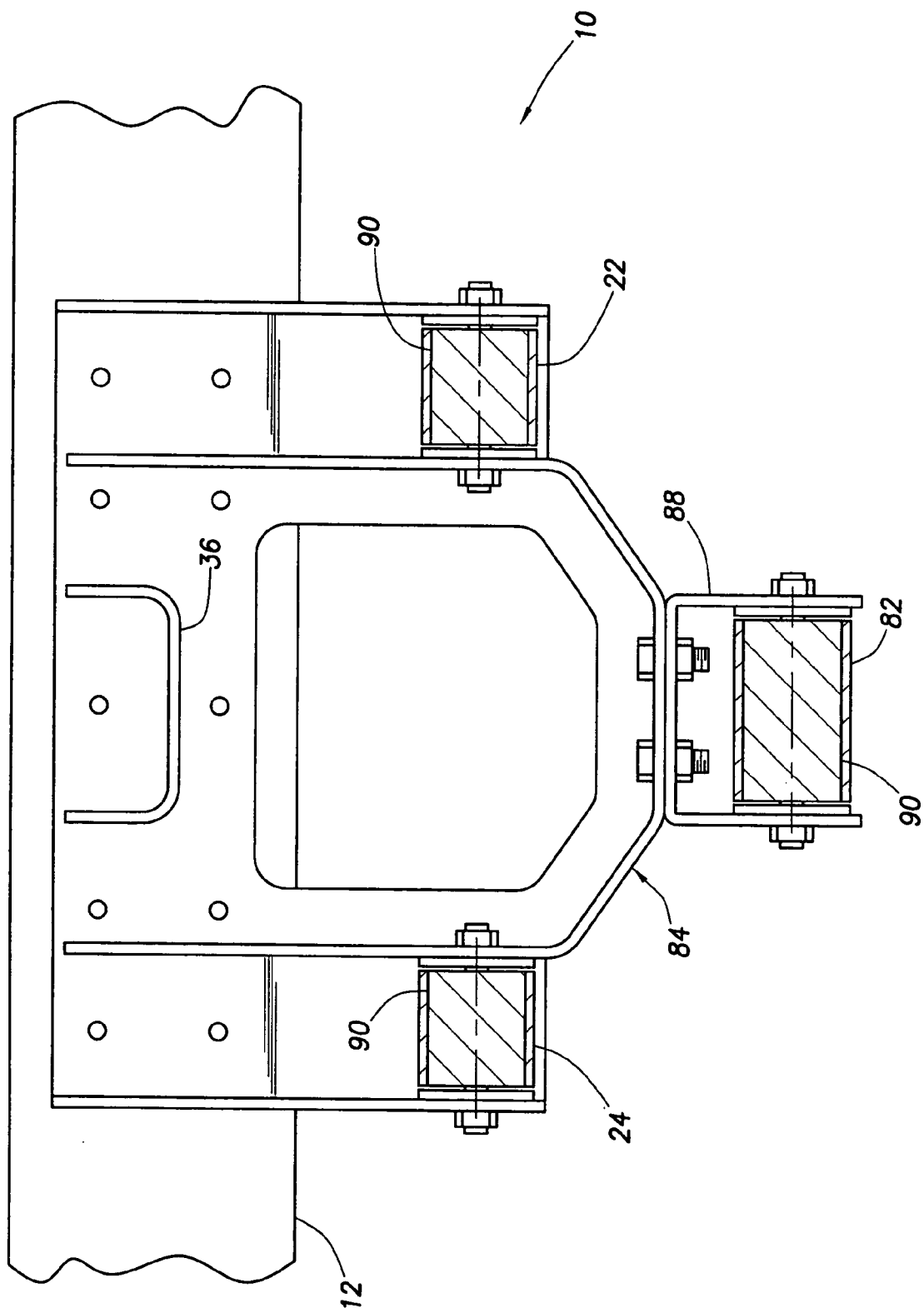
FIG. 9 is an elevational view of a bracket assembly of the seventh suspension system.

Referring additionally now to FIG. 9, the bracket assembly 84 is shown attached to the frame 12 from a side elevational view. In this view the spatial relationship between the arms 22, 24, 82, the bracket 84 and the crossmember 88 may be more clearly seen. Note that the arms 22, 24, 82 are each pivotably attached to the bracket assembly 84 using bushings 90.

The crossmember 88 may be attached to the bracket 84 by bolting, welding, or any other fastening means. To reduce weight in the suspension system 10, the crossmember 88 and/or bracket 84 may be made of a metal such as an aluminum alloy, any of the arms 22, 24, 82 (or any portion thereof) may be made of a composite material, etc.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A liftable suspension system for use on a vehicle, comprising:
   first and second wheel spindles positioned to extend outwardly at each respective lateral side of the vehicle, the first and second spindles being displaceable independent of each other, each of the first and second spindles being rotatably connected to a respective one of first and second support devices, and each of the first and second spindles being pivotably attached to a king pin of the respective one of the first and second devices; and
   an actuator operable to raise at least the first spindle, so that a tire rotatably connected to the first spindle is liftable out of engagement with a road surface when the actuator raises the first spindle.

2. The suspension system according to claim 1, wherein the first and second devices are independently displaceable relative to each other.

3. The suspension system according to claim 1, wherein each of the first and second devices is pivotably connected to a frame of the vehicle when the suspension system is attached to the vehicle.

4. A liftable suspension system for use on a vehicle, comprising:
   first and second wheel spindles positioned to extend outwardly at each respective lateral side of the vehicle, the first and second spindles being displaceable independent of each other, each of the first and second spindles being rotatably connected to a respective one of first and second support devices, and each of the first and second spindles being connected via a steering knuckle to the respective one of the first and second devices; and
   an actuator operable to raise at least the first spindle, so that a tire rotatably connected to the first spindle is liftable out of engagement with a road surface when the actuator raises the first spindle.

5. The suspension system according to claim 1, wherein the actuator is connected to the first device, so that the actuator applies an upwardly biasing force to the first device when the actuator raises the first spindle.

6. The suspension system according to claim 5, wherein the actuator is connected between the first device and a bracket configured for attachment to a frame of the vehicle.

7. The suspension system according to claim 6, wherein an arm is pivotably connected to the first device, and is pivotably connected to the bracket.

8. The suspension system according to claim 1, wherein each of the first and second devices is pivotably connected to a respective one of first and second arms, each of the first and second arms being configured for pivotable connection to a frame of the vehicle.

9. The suspension system according to claim 8, wherein the actuator is attached between the first arm and the first device.

10. A liftable suspension system for use on a vehicle, comprising:
first and second wheel spindles positioned to extend outwardly at each respective lateral side of the vehicle, the first and second spindles being displaceable independent of each other, each of the first and second spindles being rotatably connected to a respective one of first and second support devices, each of the first and second devices being pivotably connected to a respective one of first and second arms, and each of the first arid second arms being configured for pivotable connection to a frame of the vehicle; and
an actuator operable to raise at least the first spindle, so that a tire rotatably connected to the first spindle is liftable out of engagement with a road surface when the actuator raises the first spindle, and wherein the actuator elongates between an attachment to the first arm and an attachment to the first device to thereby raise the first spindle.

11. The suspension system according to claim 10, wherein the attachment to the first arm includes a bracket which secures an end of the actuator to the first arm.

12. The suspension system according to claim 10, wherein the attachment to the first device includes an inwardly extending portion of the first device, the portion extending inwardly relative to a pivot between the first arm and the first device.

13. The suspension system according to claim 12, wherein an air spring is attached to an upper side of the first device portion, and wherein the actuator is attached to a lower side of the first device portion.

14. A liftable suspension system for use on a vehicle, comprising:
first and second wheel spindles positioned to extend outwardly at each respective lateral side of the vehicle, the first and second spindles being displaceable independent of each other, each of the first and second spindles being rotatably connected to a respective one of first and second support devices, each of the first and second devices being pivotably connected to a respective one of first and second arms, each of the first and second arms being configured for pivotable connection to a frame of the vehicle, and wherein each of the first and second arms is a lower arm of a parallel link-type suspension; and
an actuator operable to raise at least the first spindle, so that a tire rotatably connected to the first spindle is liftable out of engagement with a road surface when the actuator raises the first spindle.

15. The suspension system according to claim 8, wherein each of the first and second arms is an upper arm of a parallel link-type suspension.

16. The suspension system according to claim 8, wherein the actuator is connected between the first arm and a bracket, the first arm being pivotably connected to the bracket.

17. The suspension system according to claim 8, wherein the actuator applies a force to the first arm to thereby pivot the first arm relative to the first device when the first spindle is raised.

18. The suspension system according to claim 17, wherein the actuator also applies an oppositely directed force to the first device to thereby pivot the first arm relative to the first device when the first spindle is raised.

19. The suspension system according to claim 17, wherein the actuator also applies an oppositely directed force to a bracket to thereby pivot the first arm relative to the first device when the first spindle is raised, the first arm being pivotably connected to the bracket.

20. The suspension system according to claim 19, wherein the bracket is configured for attachment to the vehicle frame.

21. The suspension system according to claim 8, further comprising a third arm pivotably connected to the first device, and wherein the actuator applies a force to the first arm and an oppositely directed force to the third arm when the first spindle is raised.

22. The suspension system according to claim 8, wherein at least one of the first and second arms is made of a composite material.

23. The suspension system according to claim 22, wherein the composite material is a resin-impregnated fabric.

24. A liftable suspension system for use on a vehicle, comprising:
first and second wheel spindles;
first and second support devices, each of the first and second spindles extending outwardly relative to a respective one of the first and second support devices;
first and second arms, each of the first and second support devices being pivotably connected to a respective one of the first and second arms, and each of the first and second arms being configured for pivotable connection to a frame of the vehicle; and
an actuator operative to lift at least the first support device relative to the vehicle frame when the suspension system is attached to the frame, the actuator applying a force to the first device and an oppositely directed force to the first arm when the first device is lifted relative to the vehicle frame,
and wherein the first and second support devices are displaceable relative to the vehicle frame independently of each other when the suspension system is attached to the frame.

25. The suspension system according to claim 24, wherein each of the first and second spindles is rotatable relative to the respective one of the first and second devices.

26. The suspension system according to claim 24, wherein each of the first and second devices has a respective one of first and second king pins secured thereto, and wherein each of the first and second spindles is pivotably connected to a respective one of the first and second king pins.

27. The suspension system according to claim 24, wherein the suspension system is steerable by rotating the first and second spindles.

28. The suspension system according to claim 27, wherein a tie rod connected between the first and second spindles forces the first and second spindles to rotate together.

29. A liftable suspension system for use on a vehicle, comprising:
first and second wheel spindles;
first and second support devices, each of the first and second spindles extending outwardly relative to a respective one of the first and second support devices;
first and second arms, each of the first and second support devices being pivotably connected to a respective one of the first and second arms, and each of the first and second arms being configured for pivotable connection to a frame of the vehicle; and
an actuator operative to lift at least the first support device relative to the vehicle frame when the suspension system is attached to the frame,
wherein the first and second support devices are displaceable relative to the vehicle frame independently of each other when the suspension system is attached to the frame, and
wherein the actuator is connected to a first side of a portion of the first device, the actuator applying a first force to the first device portion when the first device is lifted relative to the frame, and wherein an air spring is connected to an opposite second side of the first device portion, the air spring applying a second force to the first device portion to bias the first device downwardly relative to the frame.

30. The suspension system according to claim 24, wherein each of the first and second arms is part of a parallel link-type suspension.

31. The suspension system according to claim 24, further comprising an air spring connected to the first device and configured for attachment to the vehicle frame for downwardly biasing the first device relative to the frame, the air spring having an upper end which is upwardly positioned relative to a lower side of the frame when the suspension system is attached to the frame.

32. The suspension system according to claim 24, further comprising an air spring connected to the first device and configured f or attachment to the vehicle frame for downwardly biasing the first device relative to the frame, the entire air spring being outwardly positioned relative to the frame when the suspension system is attached to the frame.

33. The suspension system according to claim 24, wherein at least one of the first and second arms is made of a composite material.

34. The suspension system according to claim 33, wherein the composite material is a resin-impregnated fabric.

35. The suspension system according to claim 24, wherein the actuator is connected to the first device, so that the actuator applies an upwardly biasing force to the first device to thereby lift the first device.

* * * * *